Nov. 2, 1971 AKIRA SUZUKI ET AL 3,616,727
POWER STEERING APPARATUS
Filed June 16, 1969 3 Sheets-Sheet 1

United States Patent Office 3,616,727
Patented Nov. 2, 1971

3,616,727
POWER STEERING APPARATUS
Akira Suzuki and Takao Taira, Kariya, Japan, assignors to Toyoda Koki Kabushiki Kaisha, trading as Toyoda Machine Works, Ltd., Kariya, Aichi Prefecture, Japan
Filed June 16, 1969, Ser. No. 833,537
Claims priority, application Japan, June 21, 1968, 43/43,070
Int. Cl. F01b 3/02, 13/04; F15b 9/10
U.S. Cl. 91—499
11 Claims

ABSTRACT OF THE DISCLOSURE

The present invention relates to power steering apparatus, in which a cylinder barrel and a valve plate are relatively rotatable and in surface contact with each other. Either the cylinder barrel or the valve plate, whichever is rotatable relative to the main body of the apparatus, is in rotatable abutment with a valve member which is rotated by a steering wheel. Pressure fluid is supplied through this valve member to a cylinder chamber in the cylinder barrel and exhausted through said valve plate from said chamber, thereby pressing a piston in the cylinder chamber against an inclined ring to generate a torque which boosts the steering force.

BACKGROUND OF THE INVENTION

The present invention relates to power steering apparatus wherein pressure fluid toward and from a hydraulic rotary motor, which supplements the manual steering torque, is controlled in dependence on the relative rotational positions of two steering shaft members due to the application of manual steering torque, and is used to produce a supplemental torque to assist in turning the steerable front wheels.

The use of power steering apparatus has recently become widespread in connection with passenger cars as well as large buses and trucks. More recently its use has been extended to medium, and even compact cars. There is therefore a strong demand for smaller power steering apparatus. However, there is a limit to the reduction in size which may be attained with conventional power steering apparatus, and the production of smaller power steering devices has remained a long-standing problem. Conventional power steering apparatus comprises servo-valve means which is operated by manual steering torque and reciprocating hydraulic actuator which is controlled by the servo-valve means. The hydraulic actuator must have a piston stroke proportional to the angle through which the steerable wheels are to be turned and this naturally results in a large apparatus. On the other hand, the servo-valve means is a unit almost independent of the hydraulic actuator, and accordingly there is a limit beyond which it cannot be reduced in size.

In any conventional power steering apparatus, the high pressure fluid distributed by the servo-valve means passes to one chamber of the hydraulic actuator through a fluid conduit provided in the main body of the apparatus, while the low pressure fluid discharged from the other chamber of the hydraulic actuator passes to the tank through another fluid conduit provided in the main body, and the formation of these fluid conduits is extremely complicated.

SUMMARY OF THE INVENTION

The present invention is designed to eliminate drawbacks in conventional power steering apparatus. According to the present invention, the main body of the apparatus is made small by utilizing an axial plunger type hydraulic motor to boost the steering torque, and it is made still smaller by so arranging it that the pressure fluid can be directly supplied to the hydraulic motor through relative rotation between one member of the hydraulic motor member and the valve member rotatable by the manually applied steering torque. In a representative embodiment of the invention a relatively rotatable cylinder barrel and a valve plate are provided in abutment with each other, an odd number of cylinder chambers are provided in the cylinder barrel, pistons are slidably mounted in the respective cylinder chambers, a plurality of fluid conduits are provided in the valve plate, with the cylinder chambers communicating with the fluid conduits, and the pistons press against an inclined ring which is prevented from rotating relative to the valve plate. Either the cylinder barrel or the valve plate, whichever is rotatable, is arranged in rotatable abutment with a valve member rotatable by the steering torque applied to a steering wheel, the valve member is provided with a supply port and a discharge port which respectively communicates with a fluid inlet and a fluid outlet, whereby the fluid conduits may be brought into communication with the inlet and outlet, the valve member is rotatably attached by a resilient link member to a concentric rotatable shaft member which transmits the steering torque to steerable wheels, and the rotatable shaft member is linked to either the cylinder barrel or the inclined ring, whichever is rotatable. Thus, the hydraulic circuit of the hydraulic motor is controlled in dependence on the difference between the rotational positions of the valve member rotatable by the manual steering torque and the valve plate or the cylinder barrel, thereby boosting the steering torque to deflect the steerable wheels.

The primary object of the present invention is to provide a power steering apparatus wherein pressure fluid is directly supplied to a hydraulic rotary motor in dependence on the difference between the relative rotational positions of two steering shaft members.

Another object of the present invention is to provide a power steering apparatus which is extremely simple in structure, easy to manufacture and compact in size.

A further object of the present Invention is to provide a power steering apparatus which can respond to very small movement and has high mechanical efficiency.

Other objects and features of the present invention will be apparent from the following more detailed description and from the accompanying drawings, in which.

Figure 1:
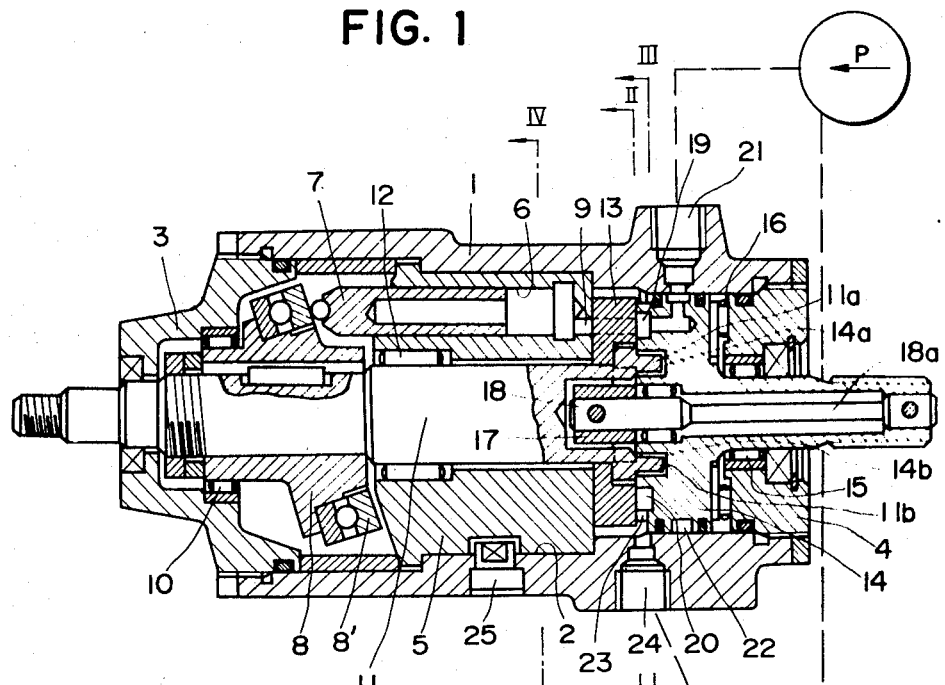
FIG. 1 shows a longitudinal section of one embodiment of the present invention.

In the first embodiment illustrated in FIG. 1, reference numeral 1 indicates the main body of a power steering apparatus. A control chamber 2 is provided in the main body 1, and both ends of the control chamber 2 are closed by end members 3, 4, equipped with suitable sealing rings. Within the control chamber 2 is a stationary cylinder barrel 5 which is prevented from movement relative to the main body 1 by a key member 25.

Figure 4:
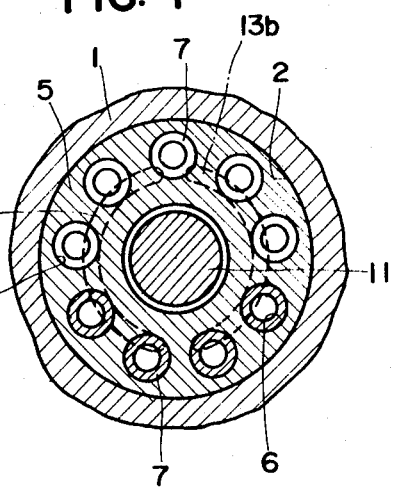
FIG. 4 is a cross-sectional view taken along the line IV—IV of FIG. 1.

In the cylinder barrel 5, as indicated in FIG. 4, an odd number of cylinder chambers 6 are formed equidistant from each other with their axes extending parallel to the axis of the cylinder barrel and equidistant therefrom. Each of the cylinder chambers 6 contains a slidable piston 7. The tip of the piston 7 projects through one end of the cylinder barrel 5 and bears through a suitable ball bearing on an inclined surface on an inclined ring or a bearing 8' which is rotatably mounted on a swash plate 8. At the right end of each cylinder chamber 6 is a hole 9 which extends through to the end of the cylinder barrel 5. The rotatable swash plate 8 is rotatably mounted in a bearing 10 in the end member 3 and a rotating output shaft 11 is concentrically keyed to the swash plate 8. The rotating output shaft 11 extends through the cylinder barrel 5 and is rotatably supported therein by a bearing 12. One end of the rotating output shaft 11 projects through the end member 3 and is connected through linkage means (not shown), to the steerable wheels. Thus, when the rotating output shaft 11 rotates, the steerable wheels are deflected right or left in accordance with the direction of rotation of the shaft 11.

Figure 2:
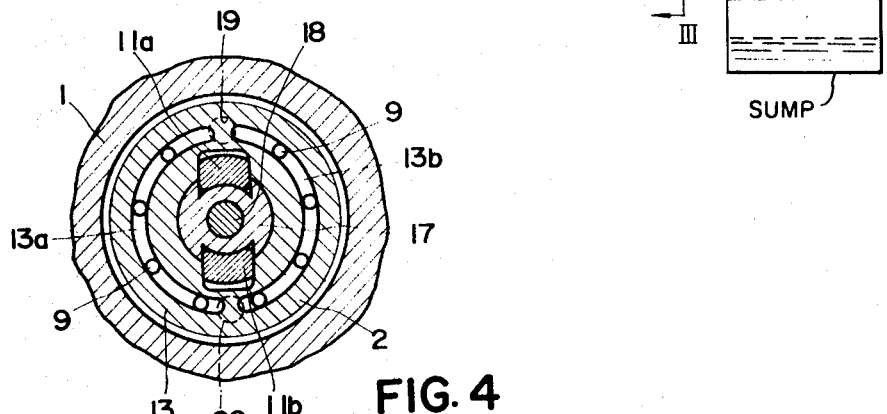
FIG. 2 is a cross-sectional view taken along the line II—II of FIG. 1.

The other end of the cylinder barrel 5 is in abutment with one side of a valve plate 13, which is rotatable with respect to the cylinder barrel. The valve plate 13, as indicated in FIG. 2, engages projections 11a and 11b carried by the other end of the rotating output shaft 11. The valve plate 13 also has two arcuate ports 13a and 13b respectively communicating with about half the holes 9 in the cylinder barrel 5.

Figure 3:
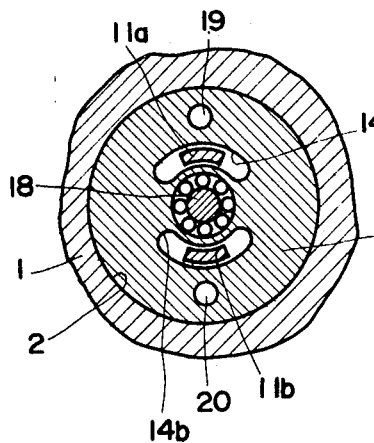
FIG. 3 is a cross-sectional view taken along the line III—III of FIG. 1.

The other side of the valve plate 13 rotatably abuts one end of a steering shaft 14 which serves as a valve member rotatably mounted in the control room chamber 2. The steering shaft 14 is rotatably supported in bearings 15 and 16 by the end member 4. A torsion bar 18 having a resilient part 18a is connected between the steering shaft 14 and ring 17 which engages (see FIG. 2) the projections 11a and 11b of the rotating output shaft 11. The two ends of the torsion bar 18 are respectively connected to the steering shaft 14 and the ring 17, and the steering shaft 14 and the rotating output shaft 11 are thereby resiliently linked together. Thus, the two shafts 11 and 14 constitute members which transmit the manually applied steering torque to the steerable wheels. A supply port 19 and a discharge port 20 are formed in the end of the steering shaft 14, which is in abutment with the valve plate 13. The pressurized fluid is supplied to the supply port 19 through a fluid inlet 21 in the main body 1 and an annular groove 22 formed in the steering shaft 14. The exhaust fluid is discharged from the discharge port 20 via a notch 23 in the steering shaft 14 and through a fluid outlet 24 in the main body 1. When the power steering apparatus is in a neutral position, as shown in FIG. 2, the supply port 19 and the discharge port 20 come into a position between the two communicating arcuate ports 13a and 13b of the valve plate 13 and slightly overlapping each of them. When the steering shaft 14 rotates either way, the supply port 19 comes into alignment with one of the arcuate ports and the discharge port 20 comes into alignment with the other of the ports. The steering shaft 14 is formed with slots 14a and 14b, which loosely engage the projection 11a and 11b respectively of the rotating output shaft 11, as shown in FIG. 3. The slots 14a and 14b permit the steering shaft 14 to rotate relative to the rotating output shaft 11 through a predetermined angle. When the steering shaft 14 rotates through more than a predetermined angle, the steering shaft 14 and the rotating output shaft 11 become directly connected, thus transmitting the steering torque applied to the steering shaft 14, directly to the rotating output shaft 11. One end of the steering shaft 14 is connected through a coupling or the like (not shown) to a steering column and a steering wheel, which can be turned by the driver.

When the supply pump (not shown) is driven by the engine or other driving means, the pressure fluid flows into the fluid inlet 21 and reaches the supply port 19. But, since the supply port 19 is located (in the state shown in FIG. 2) midway between the communicating arcuate ports 13a and 13b in the valve plate 13, the pressure fluid is distributed under equal pressure to the two arcuate ports 13a and 13b and passes through the discharge port 20 to the fluid outlet 24, through which it is discharged to be reclaimed in a sump without turning the rotating output shaft 11. If the steering wheel is then turned right, the steering shaft 14 will be turned by the steering column in the same direction. Due to the frictional resistance of the ground to the turning of the steerable wheels, and consequently to turning of the rotating output shaft 11 linked to the steerable wheels, the steering torque manually applied to the steering shaft 14 twists the torsion bar 18 and the steering shaft 14 turns relative to the rotating output shaft 11. The relative rotation between these steering shaft members, causes the supply port 19 to be displaced relative to the valve plate 13, so that it moves away from one arcuate port 13a, and into alignment with the other arcuate port 13b only. In the meantime, the discharge port 20 comes into alignment with the port 13a only, with communication to the other port 13b blocked. Therefore, the pressure fluid is supplied from the supply port 19 through the port 13b to those cylinder chambers 6 which communicate with the port 13b, thereby exerting pressure against the pistons 7 in the cylinder chambers. As a consequence, pressure is exerted by the pistons 7 against one side of the bearing on the rotatable swash plate 8 and the swash plate 8 rotates in the same direction as the steering shaft 14, and turns the rotating output shaft 11 along with it. Rotation of the rotating output shaft 11, is transmitted through conventional linkage means to turn the steerable wheels. Rotation of the swash plate 8 causes the pistons 7 in the cylinder chambers 6 which communicate with the arcuate port 13a to move back and the discharged fluid passes out through the arcuate port 13a, the discharge port 20, and the fluid outlet 24 to be reclaimed in the sump.

When the rotating output shaft 11 has turned through the same angle as the steering shaft 14, the relative rotation between the steering shaft 14 and the valve plate 13 becomes zero, again bringing the supply port 19 to the neutral position between the two arcuate ports 13a and 13b and stopping the rotation of the swash plate 8 and the rotating output shaft 11. Thus, the small steering torque applied to the steering wheel by the driver is boosted by the hydraulic motor and the steerable wheels deflect in dependence on the rotation of the steering wheel. If the steering wheel is rotated more to the right, the steerable wheels will deflect more to the right.

When the driver releases the steering wheel, the steerable wheels will resume the straight forward direction, thereby reversing movement of the rotating output shaft 11 and bringing the steering shaft 14 and the steering wheel back to neutral position.

If the steering wheel is turned to the left, the supply port 19 will come into alignment with port 13a, thereby supplying pressure fluid to the cylinder chambers 6 communicating with the port 13a and turning the swash plate 8 and the rotating output shaft 11 to the left.

The steering torque manually applied to the steering wheel will be thereby boosted and the steerable wheels will turn to the left following the rotation of the steering wheel.

Thus under this arrangement for boosting the steering torque by a hydraulic motor, the motor efficiency is extremely high and a strong steering force is obtained. Moreover, as compared with conventional apparatus comprising a reciprocating hydraulic actuator, the apparatus can be made extremely compact. Since the arrangement is such that the pressure fluid can be directly supplied to the cylinder chambers 6 by relative rotation between the valve plate, which defines the ports for the hydraulic motor, and the steering shaft 14, the power steering apparatus can be extremely simple and small in size. Further, even if a failure in the means for supplying pressure fluid occurs, the projections 11a and 11b of the rotating output shaft 11 and the ends of the engaging slots 14a and 14b of the steering shaft 14 can be engaged by rotating the steering shaft 14 through a certain angle, and as a result the steering shaft 14 and the rotating output shaft 11 become directly connected. This assures steering safety and at the same time protects the torsion bar 18, as no excessive torque can act on it. The above illustrated embodiment, in which the cylinder barrel 5 is fixed to the main body 1, is found especially advantageous in design and operation.

Figure 5:
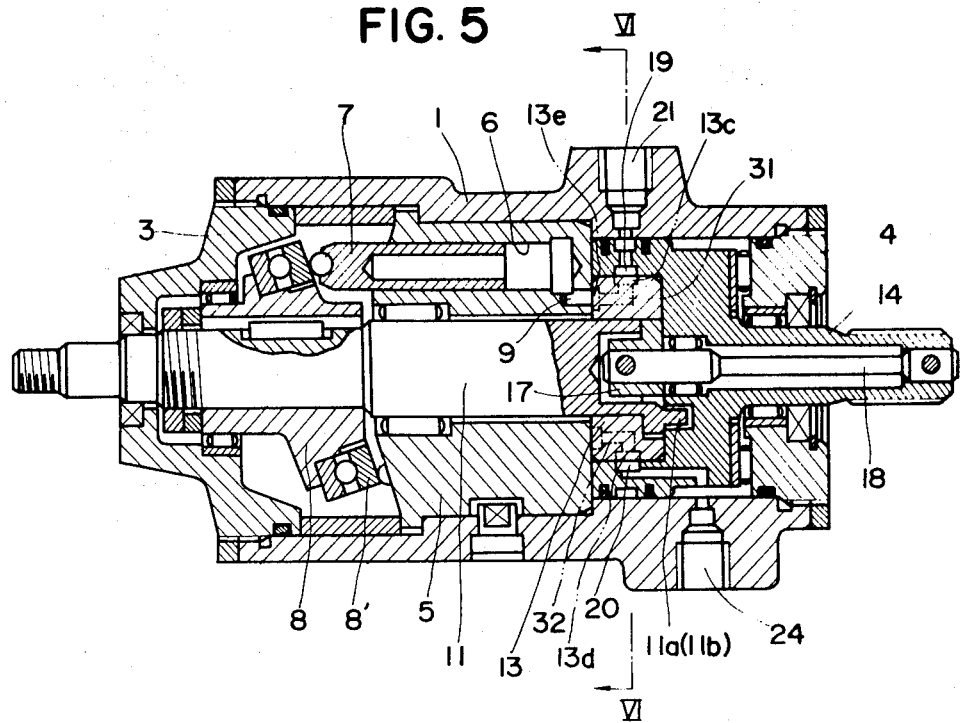
FIG. 5 is a longitudinal sectional view showing another embodiment of the invention.
Figure 6:
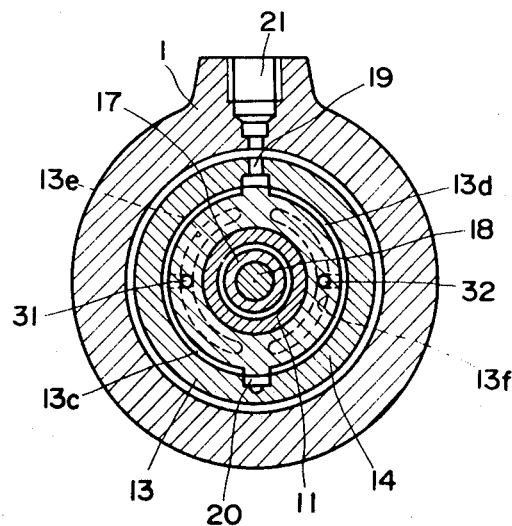
FIG. 6 is a cross-sectional view taken along the line VI—VI of FIG. 5.

FIG. 5 illustrates the second embodiment according to the present invention, which, though essentially the same as the first embodiment, differs therefrom in that the pressure fluid is distributed at the periphery of the abutting faces of the steering shaft 14 and the valve plate 13 by relative rotation between the two. The same parts as in the first embodiment are denoted by the same symbols. To explain the major difference, reference numeral 13 indicates the valve plate fixed to the rotating output shaft 11, and the steering shaft 14 has a rim which rotatably encircles the peripheral surface of the valve plate. Two circumferentially spaced semi-circular fluid conduits 13c and 13d are formed in the peripheral surface of the valve plate 13, as shown in FIG. 6. The rim of the steering shaft 14 is provided with supply port 19 and the discharge port 20, spaced from each other, which communicate respectively with the fluid inlet 21 and the fluid outlet 24, and open to the peripheral surface of the valve plate 13. At one side of the valve plate 13 there is, as in the first embodiment, a stationary cylinder barrel 5 in rotatable abutment therewith. In one side of the valve plate 13 there are formed, as indicated by the broken lines in FIG. 6, two opposed arcuate grooves 13e and 13f, which can communicate with about half the cylinder holes 9 in the cylinder barrel 5. The two conduits 13c and 13d formed in the peripheral surface of the valve plate and the two arcuate grooves 13e and 13f formed in its side surface are connected by fluid channels 31 and 32. Thus, relative rotation between the steering shaft 14 and the valve plate 13 causes the supply port 19 to communicate with one of the two grooves 13e and 13f formed on the side surface of the valve plate 13, and as a result pressure fluid is supplied through the grooves to the cylinder chambers 6 communicating with the grooves. By reason of the difference between the rotation of the steering shaft 14 and that of the valve plate 13 due to the manual steering torque, the supply port 19 is displaced from its neutral mid-position between the two conduits 13c and 13d and comes into alignment with the conduit 13c or 13d. As a result, pressure fluid is supplied through the channel 31 or 32 and the grooves 13e or 13f to the cylinder chambers 6 through the cylinder holes 9 communicating therewith, thereby deflecting the steerable wheels in dependence on the rotation of the steering wheel.

Figure 7:
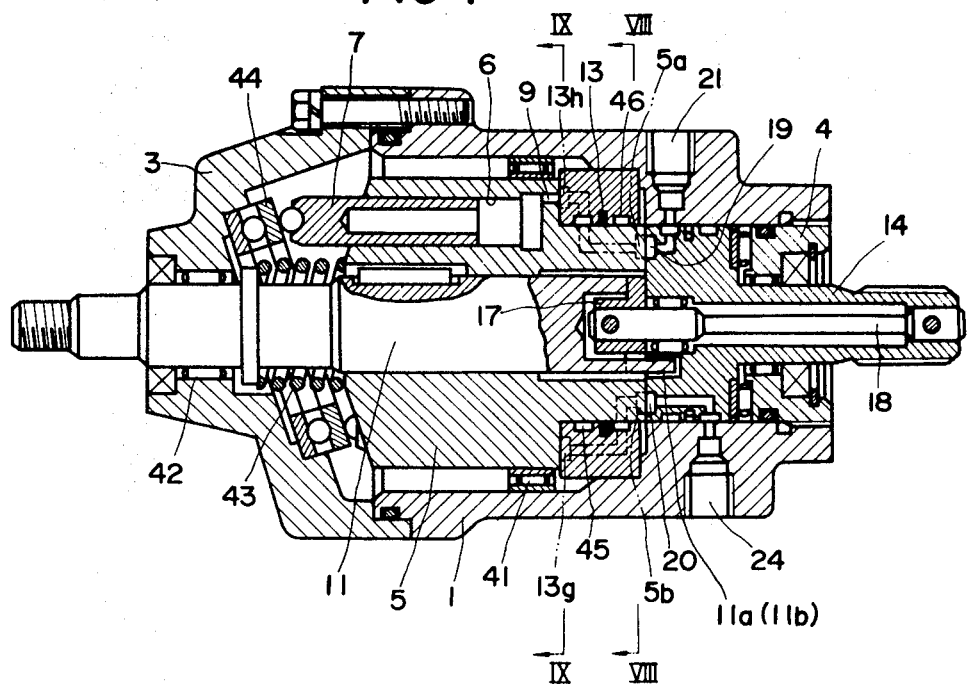
FIG. 7 is a longitudinal sectional view showing still another embodiment of the invention.

FIG. 7 illustrates a third embodiment of the invention. Whereas in the two preceding embodiments the cylinder barrel 5 is stationary, in the third embodiment the cylinder barrel is rotatable. This necessitates various alterations in the swash plate 8 and the valve plate 13. In FIG. 7, reference numeral 13 indicates the valve plate fixed to the main body 1. The cylinder barrel 5 is rotatably supported by a bearing 41 and engages the internal surface of the annular valve plate 13 and also contacts one side thereof. The rotating output shaft 11 is rotatably supported through a bearing 42 by the end member 3 and solidly keyed to the cylinder barrel 5. Between the rotating output shaft 11 and the cylinder barrel 5 is a compression spring 43 which biases the cylinder barrel 5 against the valve plate 13. The tips of the pistons 7 slidably mounted in the cylinder chambers 6 of the cylinder barrel 5 contact an inclined ring 44 rotatably supported through ball bearings by the end member 3. The steering shaft 14 is in abutment with, but can rotate relative to the side surface of the cylinder 5. A supply port 19 in the side of the steering shaft 14 which is in abutment with the side of the cylinder barrel 5, communicates with a fluid inlet port 21 in the main body. At a diametrically opposite position to the inlet port 21 a discharge port 20 in the side of the steering shaft 14 which is in abutment with the side of the cylinder barrel 5 communicates with the fluid outlet port 24 in the main body 1.

Figure 8:
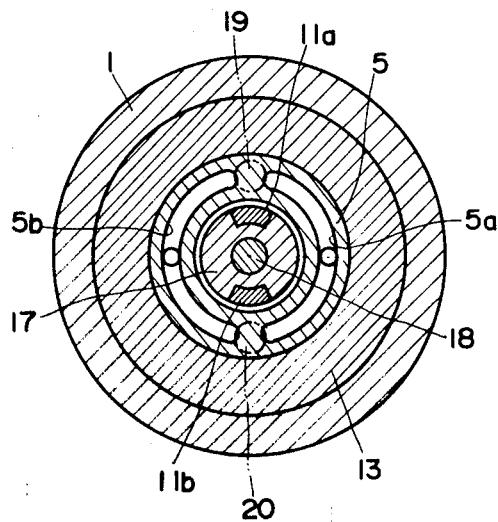
FIG. 8 is a cross-sectional view taken along the line VIII—VIII of FIG. 7.
Figure 9:
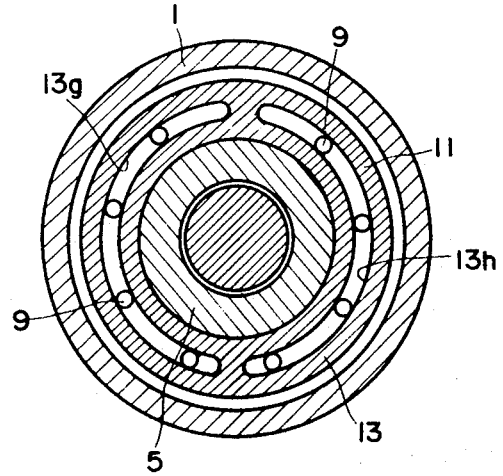
FIG. 9 is a cross-sectional view taken along the line IX—IX of FIG. 7.

In the side of the cylinder barrel 5 which is in abutment with the side of the steering shaft 14 there are formed, as shown in FIG. 8, two semi-circular fluid conduits 5a and 5b. As a result of relative rotation between the steering shaft 14 and the cylinder barrel 5, the supply port 19 comes into communication with either of the conduits 5a and 5b. Moreover, cylinder holes 9 at the surface of the cylinder barrel 5 which contacts valve plate 13, communicate respectively with the cylinder chambers 6. On the side of the valve plate 13 there are, as shown in FIG. 9, two opposed semi-circular fluid conduits 13g and 13h, and these conduits 13g and 13h are connected with the conduits 5a and 5b of the cylinder barrel 5. In this case, too, at the neutral state of the power steering apparatus, the supply port 19 and the discharge port 20 are placed midway between the two conduits 5a and 5b, as indicated in broken lines in FIG. 8.

In this arrangement, when the steering wheel is turned to the right, the torsion bar 18 is twisted, causing relative rotation between the steering shaft 14 and the cylinder barrel 5 and bringing the supply port 19 into communication with the conduit 5a. In consequence the pressure fluid supplied through the fluid inlet 21 of the main body 1 passes from the supply port 19 through the conduit 5a, the annular groove 45 and the fluid conduit 13h to the cylinder chambers 6 communicating with the conduit 13h. Thereupon, the pistons 7 in the cylinder chambers 6 communicating with the conduit 13h are urged out of the cylinder barrel 5, and rotate the cylinder barrel 5. This rotation of cylinder barrel 5 moves the rotating output shaft 11, which causes the linkage means to turn the steerable wheels in dependence on the rotation of the steering wheel. When the cylinder barrel 5 has turned through the same angle as the steering shaft 14, the supply port 19 again comes into a position midway between the two conduits 5a and 5b, and the cylinder barrel 5 stops the steerable wheels in that position.

When the steering wheel is rotated to the left, the pressure fluid is supplied from the supply hole 19 through the conduit 5b, the annular groove 46, and the fluid conduit 13g to the cylinder chambers 6 communicating with conduit 13g. As a result the cylinder barrel 5 is rotated in the opposite direction to turn the steerable wheels to the left.

As described in detail above, the present invention provides power steering apparatus in which either the cylinder barrel or the valve plate of the hydraulic motor, whichever is rotatable, is in abutment with but rotatable relative to the steering shaft which constitutes a valve member. As a consequence of relative rotation between the steering shaft and the cylinder barrel or the valve plate, due to the application of manual steering torque the supply port is brought into communication with one of the conduits in the valve plate and pressure fluid is supplied through this conduit to the cylinder barrel to drive the hydraulic motor, the rotation of which boosts the steering torque to turn the steerable wheels. When the cylinder barrel or the valve plate has rotated through the same angle as the steering shaft, the hydraulic motor stops. According to the present invention, the pressure fluid is distributed between the steering shaft and the cylinder barrel or valve plate in dependence on the relative rotational positions of the steering shaft and either the cylinder barrel or the valve plate, whichever is rotatable, and this fluid is directly supplied to the cylinder barrel through the valve plate. Thus, the cost of reaming out long fluid passages can be saved, and since the steering shaft constitutes a valve member in the hydraulic motor, the structure is simplified and very compact with a reduced number of parts. In addition to this noteworthy structural feature, the power steering apparatus according to the present invention can be easily and inexpensively manufactured. Besides, since the steering torque is boosted by a hydraulic motor, the power loss is small, and a strong steering force can be obtained with high mechanical efficiency.

The present invention is not restricted to the details of the several embodiments disclosed herein, since various modifications can be easily made by a man skilled in the art without departing from the basic concepts defined by the following claims.

What is claimed is:

1. Power steering apparatus comprising, in a main body (1), a cylinder barrel (5) and a valve plate (13), one (5) of said cylinder barrel and valve plate being fixed to said main body and the other (13) being rotatable relative thereto, said cylinder barrel being formed with an odd number of cylinder chambers (6), each provided with a slidable piston (7), and said valve plate having a plurality of ports (13a, 13b) formed therein to communicate with said cylinder chambers;

an inclined swash plate (8, 11) positioned to be pressed by said pistons and retained against rotation relative to said valve plate, so that reciprocation of said pistons causes relative rotation between said cylinder barrel on the one hand and said swash plate and valve plate on the other hand;

a valve member (14) adapted to be turned by a steering wheel, and in relatively rotatable abutment with one (13) of said cylinder barrel and said valve plate, said valve member being provided with a supply port (19) and a discharge port (20) respectively communicating with a fluid inlet (21) and a fluid outlet (24) provided in the main body; and a rotatable shaft member (11) connected to rotate with whichever of said cylinder barrel (5) and said valve plate (13) is rotatable to transmit torque, said rotatable shaft member (11) being directly connected by torsion means (18) to said valve member (14) so that, when no torque is applied to said torsion means, said valve member (14)) occupies a first angular position relative to whichever to said cylinder barrel and valve plate is in rotatable abutment with said valve member, in which first position each of said cylinder chambers is in equal communication with both said supply and discharge ports, but when torque is applied to said torsion means said valve member is brought into a second relative angular position in which some of said cylinder chambers are in communication with said supply port and others with said discharge port.

2. Power steering apparatus as claimed in claim 1, wherein said valve plate and said swash plate are fixed to said rotatable shaft member, said cylinder barrel is immobilized relative to the main body, and said valve member is in relatively rotatable abutment with said valve plate.

3. A power steering apparatus as claimed in claim 2, wherein said valve plate engages with said valve member.

4. A power steering apparatus as claimed in claim 1, wherein said cylinder barrel is fixed to said rotatable shaft member, said valve plate and said swash plate are immobilized relative to the main body, and said valve member adapted to be turned by the steering wheel is in relatively rotatable abutment with said cylinder barrel.

5. A power steering apparatus comprising a main body, a rotatable steering shaft member adapted to be turned by a steering wheel and formed with a valve member rotatably mounted in said main body, said valve member being provided with a supply port and a discharge port connected to a supply pump and a sump respectively, an output shaft member axially aligned with said steering shaft member, resilient means for connecting said steering shaft member and said output shaft member resiliently to permit relative rotational movement therebetween, a cylinder barrel provided with a plurality of cylinder chambers in which respective pistons are slidably mounted, a valve plate provided with at least one pair of arcuate grooves for communicating with said cylinder chambers through face to face abutment between said cylinder barrel and said valve plate, one of said arcuate grooves being connected to said supply port and the other being connected to said discharge port, and an inclined swash plate positioned to be pressed by said pistons and retained against rotation relative to said valve plate, one of said cylinder barrel and said valve plate being rotatable with respect to said main body and in relatively rotatable abutment with said valve member, and the other thereof being fixed to said main body.

6. A power steering apparatus as claimed in claim 5, wherein said valve plate and said swash plate are fixed to said output shaft member, said cylinder barrel being immobilized relative to the main body, and said valve member being in relatively rotatable abutment with said valve plate.

7. A power steering apparatus as claimed in claim 6, wherein said steering shaft member is provided with first engaging portions and said output shaft member is provided with second engaging portions which are adapted to engage said first engaging portions permitting relative rotational movement between said valve member and said output shaft member to a predetermined extent.

8. A power steering apparatus as claimed in claim 5, wherein said valve plate and said swash plate are fixed to said output shaft member, said cylinder barrel being immobilized relative to said main body, and said rotatable steering shaft member has a rim thereon which rotatably encircles the periphery surface of said valve plate, said rim being formed to act as said valve member.

9. A power steering apparatus as claimed in claim 8, wherein said steering shaft member is provided with first engaging portions and said output shaft member is provided with second engaging portions which are adapted to engage said first engaging portions permitting relative rotational movement between said steering shaft member and said output shaft member to a predetermined extent.

10. A power steering apparatus as claimed in claim 5, wherein said cylinder barrel is fixed to said output shaft member so that said valve plate and said swash plate are immobilized relative to the main body, and the valve member adapted to be turned by the steering wheel is in relatively rotatable abutment with said cylinder barrel.

11. A power steering apparatus as claimed in claim 10, wherein said steering shaft member is provided with first engaging portions and said output shaft member is further provided with second engaging portions which are adapted to engage said first engaging portions permitting relative rotational movement between said steering shaft member and said output shaft member to a predetermined extent.

References Cited

UNITED STATES PATENTS

| | | | |
|---|---|---|---|
| 2,979,037 | 4/1961 | Budzich | 91—175 |
| 2,988,059 | 6/1961 | Wysong, Jr. | 91—375 A |

PAUL E. MASLOUSKY, Primary Examiner

U.S. Cl. X.R.

91—375